(No Model.)
W. A. HULL.
CRACKER CUTTER.
No. 557,821. Patented Apr. 7, 1896.
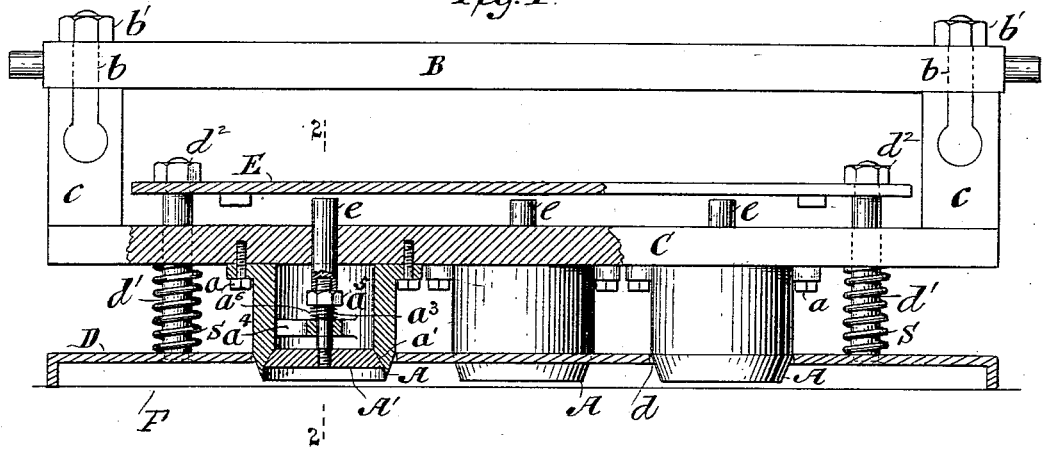
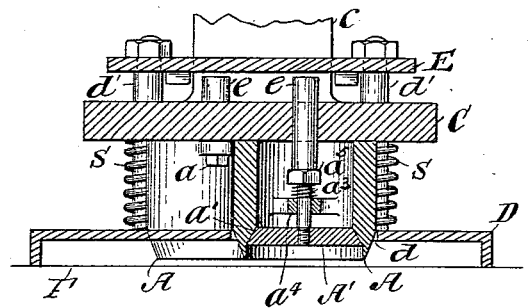
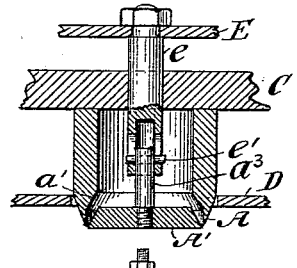
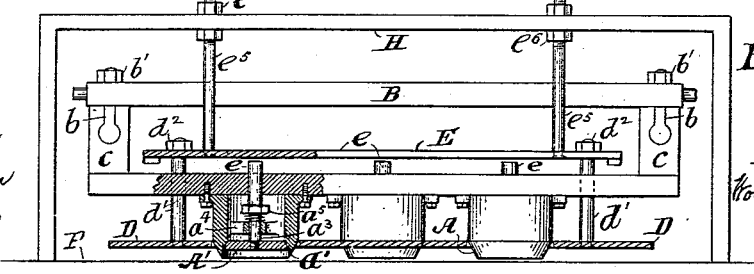
Witnesses
Geo. Wadman
J. Littlejohn
Inventor
Wolcott A. Hull

UNITED STATES PATENT OFFICE.

WOLCOTT A. HULL, OF NEW YORK, N. Y., ASSIGNOR TO THE PNEUMATIC PRESS COMPANY, OF ELIZABETH, NEW JERSEY.

CRACKER-CUTTER.

SPECIFICATION forming part of Letters Patent No. 557,821, dated April 7, 1896.

Application filed October 10, 1892. Serial No. 448,232. (No model.)

*To all whom it may concern:*

Be it known that I, WOLCOTT A. HULL, of New York, in the county and State of New York, have invented a certain new and useful Improvement in Cracker-Cutters, of which the following is a specification.

I will describe a cracker-cutter embodying my improvement, and then point out the novel features in claims.

In the accompanying drawings, Figure 1 is a front view of portions of a cracker-cutter embodying my improvement, some of the parts being shown in vertical section. Fig. 2 is a transverse vertical section of the same, taken at the plane of the dotted line 2 2, Fig. 1. Fig. 3 is a similar vertical transverse section illustrating a modification. Fig. 4 is a view similar to Fig. 1, but illustrating another modification.

Similar letters of reference designate corresponding parts in all the figures.

I will first refer to Figs. 1, 2, and 3.

A designates cutters, shapers, or formers whereby pieces of dough suitable for crackers or like articles will be severed from a layer and properly shaped. They are carried by a vertically-reciprocating cross-head B, which may be supported and moved in the ordinary or any other suitable manner. As here shown, they are not directly connected to each other, but are directly connected to a plate C by means of screws $a$, facilitating their detachment.

The plate C is intended to be detachably connected to the cross-head B. In the present instance this connection is made by means of lugs or projections $c$, extending upwardly from the plate C, and bolts $b$, extending through the cross-head B. The lugs or projections $c$ have recesses which open at the sides, so that the connection of the lugs with the bolts may be made by moving the plate C sidewise. The upper ends of the bolts $b$ extend above the cross-head, and have nuts $b'$ applied to them. By tightening these nuts the bolts may be made to clamp the lugs of the plate C to the cross-head B, so as to preclude the disconnection of the plate C from such cross-head.

The advantage of a detachable connection between the plate C and the cross-head B is to render the cutters, shapers, or formers capable of removal to facilitate the substitution of others. The detachable connection between the several cutters and the plate C enables any one of them to be readily reached for the purposes of repair or cleaning or otherwise.

D designates the stripper-plate, which may correspond in outline to the plate C. It has a number of holes $d$, corresponding to the cutters, shapers, or formers A, so that there may be a movement of said stripper-plate relatively to the cutters, shapers, or formers, and conversely a movement of the latter relatively to the stripper-plate. Rods or bolts $d'$, extending from the stripper-plate, pass up through holes in the plate C and also through a plate E, arranged above the plate C. The connection with the plate E may be made by shouldering the rods or bolts $d'$ below the plate E and applying nuts $d^2$ thereto above the plate E. Obviously the plate E will have the same movements as the stripper-plate D, and consequently an independent movement is possible between the cutters, shapers, or formers and the plate E.

Between the plate C and the stripper-plate D springs S are preferably arranged. As here shown, springs S of helical form are used and they are coiled around the rods $d'$.

The cutters, shapers, or formers A comprise clearers A', which are shaped to conform to the main portions or sections of the cutters, shapers, or formers and are approximately of the same size as the interior of the main portions or sections of the cutters, shapers, or formers.

It will of course be understood that the function of the stripper-plate is to effect the detachment of the layer of dough from the outside of the main sections or portions of the cutters, shapers, or formers, and that the function of the clearers is to detach the portions severed to form crackers or like articles from the interiors.

I do not lay any claim to any of the individual parts thus far described.

My improvement is designed to remedy a difficulty experienced with such parts as ordinarily constructed. Ordinarily the dough works into the main sections or portions of the cutters, shapers, or formers, and in time so thoroughly clogs the same as to entail the necessity for the removal of the dough. The entrance of the dough is the cause of various troubles well known to all who have had experience with cracker-cutters of the old form. The waste of time necessary for removing the dough is a very serious matter, to say nothing of the repairs caused by breakages.

To prevent the entrance of dough into the main portions or sections of the cutters, shapers, or formers, I utilize the clearers A' as valves. To this end they are preferably imperforate. In the figures I have shown the clearers as beveled or upwardly tapered and the interior of the main portions or sections of the cutters, shapers, or formers as constructed internally with the same bevel, so as to form valve-seats $a'$. It results from this that when the clearers A' are within the main portions or sections of the cutters, shapers, or formers they will tightly close the mouths of the same and prevent the ingress of dough.

It is of course important to have the clearers move in consonance with the stripper-plate D. If they were directly connected to the plate E, this purpose would be attained; but I do not deem this method of connection the most advantageous, because it would require all the parts to operate with mathematical accuracy, which, of course, is difficult of attainment. Because of this, I provide the clearers with extensions $e$, extending upwardly to a point where they can contact with the plate E, so as to force the clearers downwardly when the plate E moves downward. The extensions $e$ may be integral with the stems $a^3$, which extend upward from the clearers, or these extensions may have an interior thread to engage with an exterior thread on the stems.

Spiders or plates $a^4$ may be arranged in the main portions or sections of the cutters, shapers, or formers for guiding the stems of the clearers. If the upper extremities of the stems are provided with heads $a^5$ of a size incapable of passing through the holes in the spiders or plates, the clearers will be prevented from becoming separated from the main portions or sections of the cutters, shapers, or formers. Springs $a^6$ may be coiled around the stems of the clearers above the spiders or plates $a^4$ and beneath the heads $a^5$ to normally maintain the clearers in an elevated position.

In Fig. 3 I have shown that the stem of the clearer may be connected with an extension in such manner as to provide for lost motion or independent motion. It will be seen that the extensions are here made tubular to inclose the upper extremity of the stem, that the extension is longitudinally slotted, and that cross-pins $e'$ pass through the slots in the sleeve and engage with the extension. In this example the extension is rigidly connected to the plate E and is movable therewith.

Beneath the cutters, shapers, or formers and the stripper-plate D is a bed F, over which travels an endless apron carrying the dough.

In the operation of the machine when the cross-head B descends all the parts carried thereby will descend with it until the stripper-plate D reaches the bed F. After the stripper-plate D reaches the bed F the cross-head continues its downward movement and thereby forces the main portions or sections of the cutters, shapers, or formers through the dough. The clearers will then contact with the dough, assuming that no springs are used for sustaining them in their uppermost positions relatively to the main portions or sections of the cutters, shapers, or formers. If springs are used for this purpose, the clearers will either contact with the dough or be in close proximity thereto. In either case they will occupy substantially the same positions as the stripper-plate. The clearers will preferably be fitted snugly within the main portions or sections of the cutters, shapers, or formers, so that when there is a relative movement the clearers will compress the air between them and the dough. In most cases the air thus compressed will serve to detach the severed dough from the main portions or sections of the cutters, shapers, or formers.

When the cross-head rises, it will first elevate the main portions or sections of the cutters, shapers, or formers without moving the clearers or the stripper-plate upward. As the latter remain behind, they effect the detachment of the dough. The clearers are prevented from rising by the springs S, as the latter hold down the stripper-plate and consequently the plate E.

In Fig. 4 the parts are the same as already described, excepting that the plate E and the stripper-plate D are immovable, the stripper-plate D being connected in the usual way to the plate E, but the latter being connected by bolt-rods $e^5$ to a stationary bar H. Nuts $e^6$, applied to the bolts above and below the bar H, provide for adjusting the plate E and its appurtenances. The clearers A' are connected in the same way with the cutters, shapers, or formers as in the first example of my improvement and are similarly operated by the plate E.

While I have only described my improvement in connection with cracker-cutters, I of course desire to cover it for all other uses to which it may be applied.

What I claim as my invention, and desire to secure by Letters Patent, is—

1. The combination with a cutter, shaper or former, provided internally with a valve-seat, of a clearer made tapering and of substantially the same size circumferentially as the interior of the same and constituting a valve, substantially as specified.

2. The combination with a cutter, shaper or former, provided internally with a valve-seat, of a clearer made tapering and of substantially the same size circumferentially as the interior of the same and constituting a valve, and means for causing such relative movement between the cutter, shaper or former and clearer that the latter will be forced to remain behind the cutter, shaper or former when the latter is moved away from the dough, substantially as specified.

3. The combination with a cutter, shaper or former provided internally with a valve-seat, of a clearer made tapering and of substantially the same size circumferentially as the interior of the same and constituting a valve, and a support for said clearer and valve with which said clearer and valve are so connected as to provide for independent movement, substantially as specified.

4. The combination, with a cutter, shaper or former provided internally with a valve-seat, of a clearer closely fitting the interior of the cutter and constituting a valve, a guide for said clearer, and a loose connection between the clearer and the guide whereby the clearer may be capable of movement independently of the guide, substantially as specified.

5. The combination with a cutter, shaper or former, of a clearer, a guide for said clearer and a loose connection between the clearer and guide, whereby the clearer may be capable of movement independently of the guide, substantially as specified.

In testimony whereof I have signed my name to this specification in the presence of two subscribing witnesses.

WOLCOTT A. HULL.

Witnesses:
CLARENCE R. FERGUSON,
WALTER SMITH.